Dec. 8, 1959 W. E. COMBS 2,916,136
SECTIONAL CONVEYOR BELT MANUFACTURE
Filed May 14, 1956 2 Sheets-Sheet 1
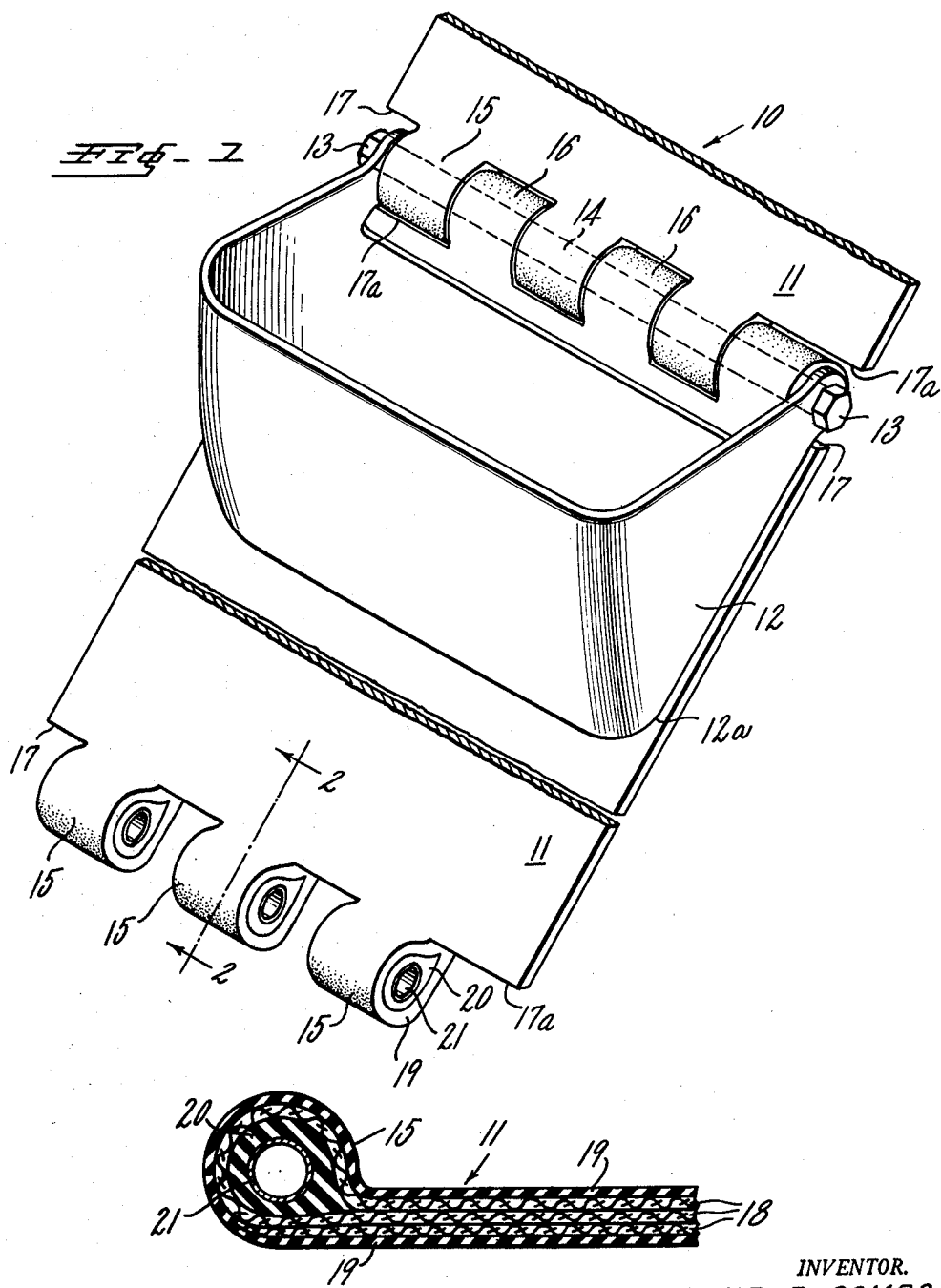
INVENTOR.
WILBUR E. COMBS
BY
ATTORNEY Dec. 8, 1959  W. E. COMBS  2,916,136
SECTIONAL CONVEYOR BELT MANUFACTURE
Filed May 14, 1956  2 Sheets-Sheet 2
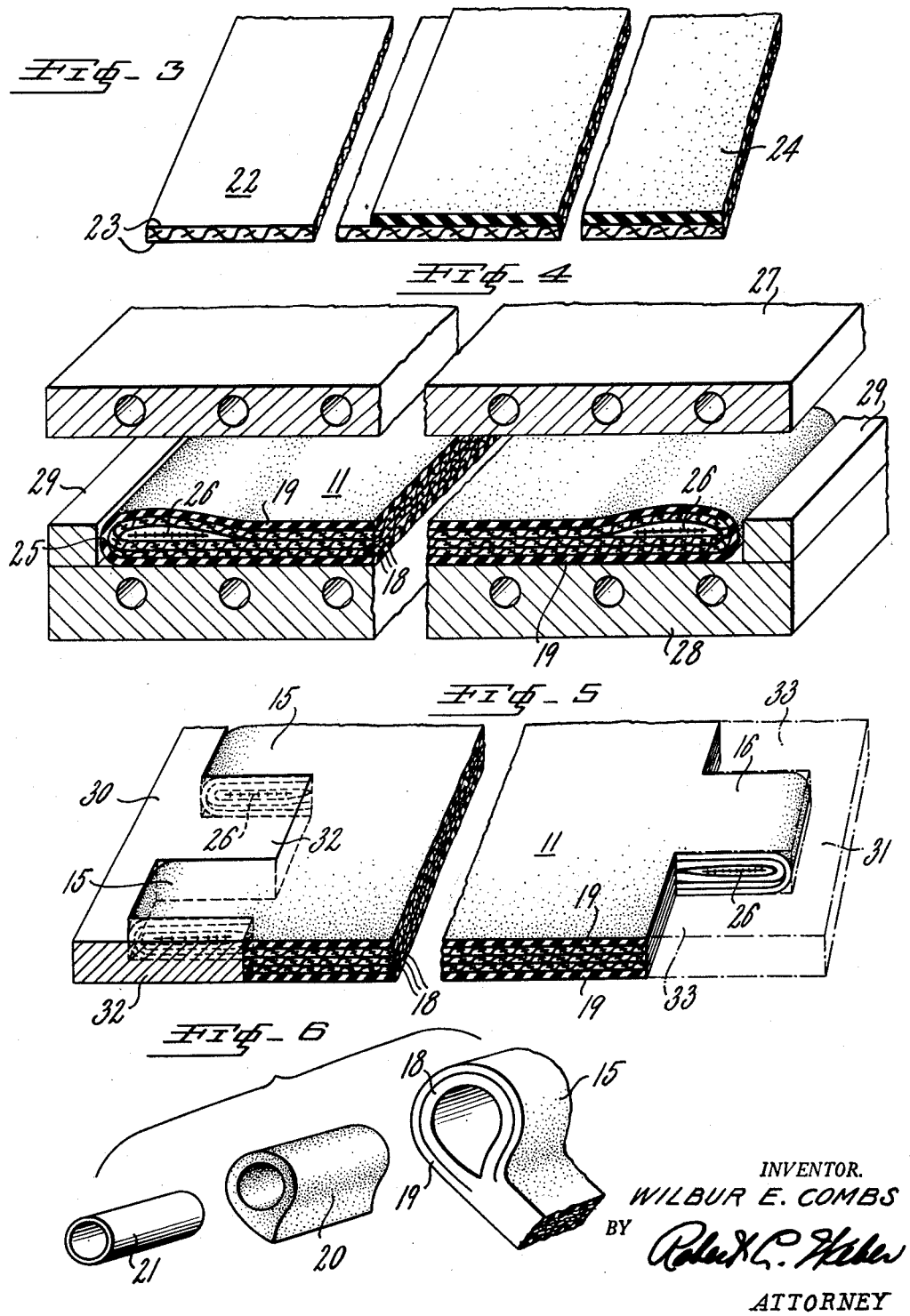
INVENTOR.
WILBUR E. COMBS
BY
ATTORNEY

United States Patent Office 2,916,136
Patented Dec. 8, 1959

2,916,136

SECTIONAL CONVEYOR BELT MANUFACTURE

Wilbur E. Combs, Feasterville, Pa., assignor to United States Rubber Company, New York, N.Y., a corporation of New Jersey Application May 14, 1956, Serial No. 584,686

9 Claims. (Cl. 198—151)

This invention relates to conveyor belts, primarily those more commonly known as elevator conveyor belts which are provided with buckets for transporting bulk materials such as grain, and more particularly to an improved sectional conveyor belt, as well as a novel method of manufacturing the same.

Conventional elevator conveyor belts in use at the present time are formed into a continuous loop by one or more mechanical splices which create one or more stiff sections in the belt and rely upon the fabric reinforcement alone to withstand shear forces. The buckets are usually attached by means of bolts extending through holes punched in the belt. This is unsatisfactory because it is necessary to provide an unduly heavy belt to withstand the force exerted by the bolt heads, as well as washers to back up the bolt heads, which cause damage to the belt as it passes over the pulleys. Within a relatively short time the belt fails either due to the shear forces on the fabric in the weak splice, or the bucket bolts pull out through the holes in the belt, which are also weak points.

The internal construction of such conventional belts also has some disadvantages. First of all, the fabric reinforcement employed is usually "square woven," cotton material known as "duck." Since most of the tensile or shear stress placed on such belts lies in the direction of movement, that is, longitudinally of the belt, only the longitudinally extending fibers are subject to stress, the equal number of transversely extending fibers being useless in this respect. As a consequence, this applied stress is concentrated on substantially half of the reinforcement, thereby reducing belt tensile or shear strength by approximately 50% and requiring unduly heavy belts, i.e., many plies, for heavy duty requirements.

Accordingly, it is an object of this invention to provide an improved sectional conveyor belt and a novel method of manufacturing the same whereby (1) the use of mechanical splices, bolts, washers and their respective defects are completely eliminated and (2) the use of "duck" with its corresponding strength limitations may likewise be completely eliminated.

Another object of the invention is to provide an improved sectional conveyor belt so constructed and arranged that (1) it is much more flexible, stronger, and lighter in weight than comparable conventional belts; (2) each interconnected section thereof has hinge portions which provide a stronger means for attaching buckets thereto while eliminating the weak splices and bolt type attaching means in prior art belts; (3) it has a longer life expectancy, can be easily installed and replaced, requires much less maintenance than conventional belts, and (4) it is particularly adapted to a high speed, centrifugal discharge type of elevator conveyor wherein the buckets are spaced a substantial distance apart, rather than a low speed conveyor having the buckets located adjacent each other throughout the length of the belt.

Another object of the invention is to provide the novel method of manufacturing such a belt, which method (1) is much quicker, more economical, and better adapted to mass production than prior art methods, particularly in the elimination of splice formation and bolt type, bucket attaching means; (2) greatly simplifies the building up of the various belt plies and the formation of the hinge portions of the belt sections in a novel and unique manner, and (3) requires no special, costly equipment such as molds, while being capable of producing a belt having a molded appearance.

The above, as well as other objects and advantages of the invention will become apparent upon consideration of the following specification and claims, when read in conjunction with the accompanying drawings wherein:

Fig. 1 is a partial perspective view of the belt illustrating two adjacent belt sections and a bucket attached thereto;

Fig. 2 is an enlarged, partial sectional view taken substantially on line 2—2 of Fig. 1 and illustrates the internal structure of the body and a hinge portion of a belt section;

Fig. 3 is a partial perspective view illustrating the fibrous sheet impregnated and coated with the elastomeric material from which sheet the belt sections are built up;

Fig. 4 is a partial perspective view illustrating the body of a belt section built up from the sheet of Fig. 3, and the separation of the plies adjacent each end of the body, as well as the press and preferred method wherein the body is cured before the hinge portions are formed;

Fig. 5 is a partial perspective view of a belt section having the hinge portions formed thereon, and illustrates partially in phantom a modification of the curing press and an alternative method for curing the belt body after the hinge portions are formed, and Fig. 6 is a partial, exploded perspective view illustrating the components of a hinge portion.

Referring to Fig. 1 of the drawings, the belt 10 comprises a plurality of interconnected, flexible belt sections 11 to which are attached the buckets 12, by means of nuts 13 and rods or pintles 14 passing through the interlocking hinge portions 15, 16 of the adjacent belt sections. As will be apparent, each belt section 11 is provided with three hinge portions 15 at one end and three hinge portions 16 at the other; the hinge portions 15 interlocking with the hinge portions 16 of adjacent belt sections to form belt 10 into a continuous loop (not shown). By incorporating an equal number of hinge portions 15, 16 on each end of a belt section 11, each section when worn, say by abrading contact with the heel 12a of bucket 12, could readily be reversed longitudinally so that an unworn portion thereof would abut the heel of the bucket. This results in substantially longer belt operating life than possible with the aforesaid prior art constructions. In addition, the outer two of hinge portions 15, 16 are "set in" to form notches 17, 17a respectively, in belt 10 between each section 11 so that the sides of the buckets 12, nuts 13 and rods 14 do not project beyond the edges of the belt 10. Thus, there are no undesirable projections on the belt 10 to interfere with its movement around its pulleys (not shown) or within the elevator housing (not shown).

Referring to Fig. 2, the detailed structure of each belt section 11 will now be described. The body of the belt section 11 is made up of a plurality of continuous superimposed plies 18 of fibrous material impregnated with elastomeric material, and an outer ply 19 of elastomeric material surrounding the superimposed plies 18. Adjacent each end of belt section 11, two of the adjacent plies 18 are separated in order to form the hinge portions 15 or 16. For the particular three ply construction shown, the two upper plies 18 are separated so that the tensile stress applied to the hinge portions at each end will be transmitted to the stronger fabric which is folded to form at least one continuous loop at each end, rather than to the weaker rubber covering 24. As will be apparent, the attenuated arcuate bushing 20 of elastomeric material is inserted and secured between the loop formed by separated plies 18 in each hinge portion, to completely fill the space within the loop, and a hollow bearing 21 is inserted and secured within bushing 20 for the reception of rod 13.

It is preferred that the plies 18 be made of a "tie cord" type fabric such as nylon, rayon or cotton, i.e., one comprised primarily of cords extending longitudinally of the belt with a few, widely spaced tie cords extending transversely of the belt in order to obtain maximum strength with the minimum number of plies. While the plies 18 are illustrated as conventional "square woven" fabric, this is purely for illustrative purposes, as the "tie cord" type is approximately twice as strong as the "square woven" type. In addition, each of the plies 18 are impregnated with a suitable elastomeric material, preferably natural or synthetic rubber, which is likewise employed for the cover 19 and bushing 20. The bearing 21 could be made of any suitable plastic or metal; the bushing 20 being secured to the separated plies 18 by a suitable cement and the bearing 21 being likewise secured to the bushing 20.

It will be noted that while the hinge portions 15 and 16 of the adjacent belt sections 11 interlock with each other, they do not bind against each other so that the sections 11 will readily flex to conform to the contour of their pulleys (not shown), the hinge portions 15, 16 pivoting relative to one another about the rods 13. Likewise, the rods 13 fit freely within bearings 21 so that the buckets 12 can readily pivot as the belt 10 passes around the pulleys. As will now be apparent, the belt 10 is not only strong but flexible, and the unique hinge portions 15, 16 provide a novel attaching means for the buckets 12, thereby eliminating stiff sections and points of stress concentration, as well as weak points in the belt, all of which are present in the prior art constructions which employ the bolt-type, bucket attaching means. Consequently, the belt 10 produced in accordance with the teachings of this invention has a much longer operating life than those produced in accordance with present practice.

Referring to Figs. 3 through 6, the manner in which each belt section 11 is constructed will now be described. As seen in Fig. 3, a sheet 22 of "tie cord" type fabric is impregnated with rubber by applying what is known in the art as a "friction" coating 23 on each side thereof by passing the sheet 22 through a mill roll (not shown) in the usual manner. Next, a rubber covering commonly referred to as a "skim" coating 24 is similarly applied to only one side of sheet 22 along approximately two-thirds of its length. As will be apparent, the sheet 22 and "friction" coating 23 will form plies 18, while "skim" coating 24 will form outer ply 19 in the completed belt section 11.

Referring now to Fig. 4, the sheet 22 with "friction" coatings 23 and "skim" coating 24 is then folded on and around itself to form the body of one or more belt sections 11. In performing this operation, the one-third of sheet 22 which does not have the "skim" coating 24 is folded underneath the adjacent one-third of sheet 22 which has coating 24; the remaining one-third of sheet 22 having coating 24 is folded around and beneath the first one-third to complete the body; the ends of the coating 24 joining at 25 along one end of the belt body to complete outer covering 19. In order to prevent the continuous plies 18 formed from sheet 22 and coatings 23 from adhering to each other at each end of the belt body so that the hinge portions 15, 16 may be easily formed later, strips 26 of holland cloth are interposed between the central ply 18 and the upper ply 18 as the sheet 22 is folded.

Now that the uncured body of one or more belt sections 11 has been formed, the curing thereof and the formation of the hinge portions 15, 16 may be completed in either of two ways. Preferably, the body is inserted between two heated platens 27, 28; the ends of the body fitting snugly against guides 29 on platen 28. The platens 27, 28 are then closed to the extent permitted by the guides 29 in order to cure the belt body under heat and pressure whereby the plies 18 and covering 19 are integrally bonded together, except where the two adjacent plies are separated by the strips 26. The guides 29 are of the desired height so that the correct amount of pressure is applied to control the thickness of the belt body, and the guides are so spaced to properly control the length of the body, whereby each belt section 11 will be uniform in both length and thickness.

After the body forming one or more belt sections 11 has been cured, it is removed from platens 27, 28, whereupon portions at each end are cut or "dinked" out to partially form the hinge portions 15, 16, as shown in Fig. 5. This operation may readily be performed in a conventional punch press (not shown).

Alternatively, the punching operation could be performed before the curing operation. This would necessitate replacing the guides 29 in Fig. 4 with the guides 30 and 31 (the latter being shown in phantom) in Fig. 5; the guide 30 being provided with projections 32 (only two of which are shown) to enclose hinge portions 15, and the guide 31 being provided with projections 33 (only two of which are shown in phantom) for enclosing hinge portions 16. In this alternative procedure, the heat and pressure applied by platens 27, 28 would cause the rubber cover 19 to flow over the raw, exposed edges of hinge portions 15, 16, as well as the body itself, thereby producing a molded appearance, as opposed to the former procedure wherein the raw edges of the belt body remain exposed after curing.

Nevertheless, it is preferred that the body forming one or more belt sections 11 be cured prior to the punching operation partially forming the hinge portions 15, 16, because it lends itself more readily to mass production of the belt sections 11. For example, while only one belt section 11 is shown in Fig. 4, the actual width of sheet 22 could be any desired size, so that any desired number of belt sections 11 could be cut from the body formed by a very wide sheet. The belt body could readily be fed in between platens 27, 28 to successively cure portions thereof, the cured portions being simultaneously cut to the desired width for each belt section 11 along with the punching of the hinge portions 15, 16. As will be apparent, such mass production would require no special equipment such as the more expensive type guides 30, 31; would permit the belt body to slide readily between platens 27, 28 rather than require each portion thereof to be lifted into and out of guides 30, 31, and would permit the strips 26 to be readily removed from between the separated plies 18 rather than require the covering 19 to be slit before removal of the strips 26 (which would be necessary when the hinge portions 15, 16 were "dinked" out prior to curing of the belt section 11). All of this amounts to substantial savings in production time, labor and equipment.

At this point, the completion of hinge portions 15, 16 takes place as shown in Fig. 6. The strips 26 having been removed, as noted above, the continuous loops formed by the separated plies 18 may readily be spread further apart for the reception of the bushings 20. These rubber bushings 20 have been previously molded to a hollow, tear drop shape and are cut to length for insertion into each hinge portion 15, 16. Either the cured bushings 20 or the separated plies 18, or both, may be coated with a suitable cement such as maleic anhydride to firmly secure the bushings 20 within hinge portions 15, 16. Finally, the hollow bearing 21 is likewise inserted and secured by any suitable rubber-metal bonding cement in each bushing 20, to complete the formation of the hinge portions 15, 16. When the desired number of belt sections 11 are formed, they may be readily assembled together with buckets 12 by means of nuts 13 and rods 14, as shown in Fig. 1, to complete the formation of belt 10.

As will now be apparent, the above described method of manufacturing the belt 10 completely eliminates the use of mechanical splices, bolt heads and washers required in prior art practice, along with the corresponding defects thereof. In addition, such method can readily be adapted to mass production of belts with considerable savings in production costs, while producing a belt having maximum strength and flexibility, with a minimum amount of material.

In order to obviate any ambiguities in meaning, a number of technical terms employed herein are defined as follows. "Cord" is the product produced by twisting together two or more plied yarns; "friction coat" is an impregnation of rubber material calendered by friction motion to a fabric so that the material is forced into the weave of the fabric; "skim coat" is a layer of rubber material laid on a fabric (as by calendering), but not forced into the weave, and as here, is normally laid on a frictioned fabric; "holland cloth" is a sheeting cloth to which has been applied a glazed finish by applying an oil and filling material or starch followed by a thorough calendering.

While this invention has been described with particular reference to the embodiments illustrated in the accompanying drawings, it will be apparent that various changes in the practice of the invention may be made by those skilled in the art without departing from the principles of the invention, the scope of which is to be determined by the appended claims.

Having thus described my invention, what I claim and desire to protect by Letters Patent is:

1. A conveyor belt comprising a plurality of interconnected, flexible belt sections, each section comprising a body composed of a sheet of fibrous tie cord fabric and elastomeric material folded on and around itself to form continuous superimposed plies the number of which are constant throughout the length of said body, certain of which are separated to form continuous loops adjacent the ends of the body, said body being cured to unite said plies except where separated, the ends of said body being slotted to form hinge portions around said loops to receive means adapted to interconnect said sections.

2. A conveyor belt comprising a plurality of interconnected, flexible belt sections, each section comprising a body composed of a sheet of fibrous tie cord fabric having a friction coating of elastomeric material on each side, and a skim coating of elastomeric material on one side along a portion of its length equal to approximately twice the length of said body, said sheet being folded on and around itself to form continuous superimposed plies of fibrous tie cord fabric impregnated with elastomeric material the number of which are constant throughout the length of said body, certain of which are separated to form continuous loops adjacent the ends of the body, and an outer ply of elastomeric material surrounding said superimposed plies, said body being cured to unite said plies except where separated, the ends of said body being slotted to form hinge portions around said loops, and a hollow, attenuated arcuate bushing of cured elastomeric material inserted and secured within the loop in each hinge portion to completely fill the space within said loop and to receive means adapted to interconnect said sections so as to be freely pivotable relative to each other.

3. A conveyor belt comprising a plurality of interconnected, flexible belt sections, each section comprising a body composed of a sheet of fibrous material having primarily longitudinally extending cords with widely spaced transversely extending tie cords, a friction coating of elastomeric material on each side, and a skim coating of elastomeric material on one side along a portion of its length equal to approximately twice the length of said body, said sheet being folded on and around itself transversely of said cords to form continuous superimposed plies of fibrous material impregnated with elastomeric material the number of which are constant throughout the length of said body, two of which are separated to form continuous loops adjacent the ends of the body simultaneously with the folding of said sheet, and an outer ply of elastomeric material surrounding said superimposed plies, said body being cured to unite said plies except where separated, before the ends of said body are slotted to form hinge portions around said loops, a hollow, tear drop shaped bushing of cured elastomeric material inserted and secured within the loop in each hinge portion to completely fill the space within said loop, and a hollow bearing inserted and secured within each bushing for receiving means adapted to interconnect said sections so as to be fully pivotable relative to each other.

4. A conveyor belt comprising a plurality of interconnected, flexible belt sections, each section comprising a body composed of a sheet of fibrous material having primarily longitudinally extending cords with widely spaced transversely extending tie cords, a friction coating of elastomeric material on each side, and a skim coating of elastomeric material on one side along a portion of its length equal to approximately twice the length of said body, said sheet being folded on and around itself transversely of said longitudinally extending cords to form continuous superimposed plies of fibrous material impregnated with elastomeric material the number of which are constant throughout the length of said body, two of which are separated to form continuous loops adjacent the ends of the body simultaneously with the folding of said sheet, and an outer ply of elastomeric material surrounding said superimposed plies, said body being cured to unite said plies except where separated, after the ends of said body are slotted to form hinge portions around said loops, a hollow, tear drop shaped bushing of cured elastomeric material secured within the loop in each hinge portion to completely fill the space within said loop, and a hollow bearing inserted and secured within each bushing for receiving means adapted to interconnect said sections so as to be freely pivotable relative to each other.

5. A method of making a conveyor belt comprising a plurality of interconnected, flexible belt sections, said method comprising the steps of forming the body of each section by folding a sheet of fibrous tie cord fabric and elastomeric material to form continuous superimposed plies the number of which are constant throughout the length of said body and separating certain of said superimposed plies to form continuous loops adjacent the ends of the body, curing said body to unite said plies except where separated and slotting the ends of said body to form hinge portions around said loops to receive means adapted to interconnect said sections.

6. A method of making a conveyor belt comprising a plurality of interconnected, flexible belt sections, said method comprising the steps of forming the body of each section by folding a sheet of fibrous tie cord fabric having a friction coating of elastomeric material on each side and a skim coating of elastomeric material on one side along a portion of its length equal to approximately twice the length of said body, on and around itself to form continuous superimposed plies of fibrous tie cord fabric impregnated with elastomeric material the number of which are constant throughout the length of said body and an outer ply of elastomeric material surrounding said superimposed plies and separating certain of said superimposed plies to form continuous loops adjacent the ends of the body, curing said body to unite said plies except where separated and slotting the ends of said body to form hinge portions around said loops, and inserting and securing a hollow, attenuated arcuate bushing of cured elastomeric material within the loop in each hinge portion to completely fill the space within said loop and to receive means adapted to interconnect said sections so as to be freely pivotable relative to each other.

7. A method of making a conveyor belt comprising a plurality of interconnected, flexible belt sections, said method comprising the steps of forming the body of each section by providing a sheet of fibrous material having primarily longitudinally extending cords with widely spaced transversely extending tie cords, applying a friction coating elastomeric material to each side of said sheet, applying a skim coating of elastomeric material to one side of said sheet along a portion of its length equal to approximately twice the length of said body, folding said sheet on and around itself transversely of said longitudinally extending cords to form continuous superimposed plies of fibrous material impregnated with elastomeric material the number of which are constant throughout the length of said body and an outer ply of elastomeric material surrounding said superimposed plies and simultaneously separating two of said superimposed plies to form continuous loops adjacent the ends of the body, curing said body to unite said plies except where separated before slotting the ends of said body to form hinge portions around said loops, inserting and securing a hollow, tear drop shaped bushing of cured elastomeric material within the loop in each hinge portion to completely fill the space within said loop, and inserting and securing a hollow bearing within each bushing for receiving means adapted to interconnect said sections so as to be freely pivotable relative to each other.

8. A method of making a conveyor belt comprising a plurality of interconnected, flexible belt sections, said method comprising the steps of forming the body of each section by providing a sheet of fibrous material having primarily longitudinally extending cords with widely spaced transversely extending tie cords, applying a friction coating elastomeric material to each side of said sheet, applying a skim coating of elastomeric material to one side of said sheet along a portion of its length equal to approximately twice the length of said body, folding said sheet on and around itself transversely of said longitudinally extending cords to form continuous superimposed plies of fibrous material impregnated with elastomeric material the number of which are constant throughout the length of said body and an outer ply of elastomeric material surrounding said superimposed plies and simultaneously separating two of said superimposed plies to form continuous loops adjacent the ends of the body, curing said body to unite said plies except where separated after slotting the ends of said body to form hinge portions around said loops, inserting and securing a hollow, tear drop shaped bushing of cured elastomeric material within the loop in each hinge portion to completely fill the space within said loop, and inserting and securing a hollow bearing within each bushing for receiving means adapted to interconnect said sections so as to be freely pivotable relative to each other.

9. A conveyor belt comprising a plurality of interconnected, flexible belt sections, each section comprising a body composed of a sheet of fibrous tie cord fabric and elastomeric material folded on and around itself to form continuous superimposed plies the number of which are constant throughout the length of said body, certain of which are separated to form continuous loops adjacent the ends of the body, said body being cured to unite said plies except where separate, the ends of said body being slotted to form hinge portions around said loops, connecting means inserted within the loop in each hinge portion interconnecting said sections and a plurality of buckets attached to said connecting means.

References Cited in the file of this patent

UNITED STATES PATENTS

| | | |
|---|---|---|
| 1,627,354 | Thorsten | May 3, 1927 |
| 2,238,216 | Eger | Apr. 15, 1941 |
| 2,252,836 | Curry et al. | Aug. 19, 1941 |
| 2,375,170 | McNeil | May 1, 1945 |
| 2,553,646 | Field | May 22, 1951 |
| 2,799,177 | Henson | July 16, 1957 |

FOREIGN PATENTS

| | | |
|---|---|---|
| 444,469 | Germany | May 18, 1927 |
| 708,461 | Great Britain | May 5, 1954 |